United States Patent
Steele

(10) Patent No.: US 9,726,416 B2
(45) Date of Patent: Aug. 8, 2017

(54) TRANSPORT REFRIGERATION SYSTEM WITH ENGINE EXHAUST COOLING

(75) Inventor: John T. Steele, Marcellus, NY (US)

(73) Assignee: CARRIER CORPORATION, Farmington, CT (US)

(*) Notice: Subject to any disclaimer, the term of this patent is extended or adjusted under 35 U.S.C. 154(b) by 469 days.

(21) Appl. No.: 14/346,061

(22) PCT Filed: Sep. 7, 2012

(86) PCT No.: PCT/US2012/054123
§ 371 (c)(1),
(2), (4) Date: Mar. 20, 2014

(87) PCT Pub. No.: WO2013/043391
PCT Pub. Date: Mar. 28, 2013

(65) Prior Publication Data
US 2014/0250941 A1 Sep. 11, 2014

Related U.S. Application Data

(60) Provisional application No. 61/538,304, filed on Sep. 23, 2011.

(51) Int. Cl.
F25B 27/00 (2006.01)
F25D 11/00 (2006.01)
(Continued)

(52) U.S. Cl.
CPC ......... F25D 11/003 (2013.01); B60H 1/3232 (2013.01); B60K 13/04 (2013.01);
(Continued)

(58) Field of Classification Search
CPC .............. F25B 27/02; F25B 2327/001; F25B 2313/02322; F25B 2313/0211; F25B 2313/009; B60H 1/3232; B60K 13/04
See application file for complete search history.

(56) References Cited

U.S. PATENT DOCUMENTS 4,850,197 A 7/1989 Taylor et al.
5,222,469 A 6/1993 Sutton
(Continued)

FOREIGN PATENT DOCUMENTS

EP 1628091 A2 2/2006
EP 1628101 A2 2/2006
JP 6341731 A 12/1994

OTHER PUBLICATIONS

PCT International Preliminary Report on Patentability and Written Opinion of the International Searching Authority for International Application No. PCT/US2012/054123, Apr. 3, 2014, 9 pages.
(Continued)

Primary Examiner — David Teitelbaum
(74) Attorney, Agent, or Firm — Cantor Colburn LLP

(57) ABSTRACT

A heat exchanger includes an inner tube extending along a central axis, an array of a plurality of heat transfer members mounted to the inner tube, and a plurality of outer tubes disposed radially outward of and in parallel relationship to the inner tube, the inner and outer tubes extending longitudinally to pass through the array of heat transfer members. The heat exchanger is particularly suited for use as an engine exhaust cooler in connection with a transport refrigeration unit, wherein the inner tube defines an internal flow passage through which engine exhaust gas passes, each outer tube defines an internal flow passage through which refrigerant passes, and the plurality of flow passages between adjacent heat transfer members defines an air flow passage. In an embodiment, the heat transfer members may be annular disks having an internal chamber filled with air or other heat transfer working fluid.

14 Claims, 3 Drawing Sheets

(51) Int. Cl.
  B60K 13/04 (2006.01)
  F25B 27/02 (2006.01)
  F25B 47/02 (2006.01)
  B60H 1/32 (2006.01)
  F25B 40/00 (2006.01)
  F25B 49/02 (2006.01)
(52) U.S. Cl.
  CPC .............. *F25B 27/00* (2013.01); *F25B 27/02* (2013.01); *F25B 47/022* (2013.01); *F25B 40/00* (2013.01); *F25B 49/02* (2013.01); *F25B 2313/009* (2013.01); *F25B 2313/0211* (2013.01); *F25B 2313/02322* (2013.01); *F25B 2327/001* (2013.01); *F25B 2400/0409* (2013.01); *F25B 2400/16* (2013.01); *F25B 2600/2507* (2013.01)

(56) References Cited

U.S. PATENT DOCUMENTS

| | | | |
|---|---|---|---|
| 6,543,531 B1 * | 4/2003 | Casar | B60H 1/00907 165/202 |
| 6,708,507 B1 | 3/2004 | Sem et al. | |
| 6,910,345 B2 | 6/2005 | Horstmann et al. | |
| 7,143,594 B2 | 12/2006 | Ludwig et al. | |
| 7,503,184 B2 | 3/2009 | Copeland et al. | |
| 2005/0188711 A1 * | 9/2005 | Wang | B60H 1/00878 62/238.6 |
| 2007/0234715 A1 * | 10/2007 | Willi | F01N 5/02 60/320 |
| 2009/0314019 A1 | 12/2009 | Fujimoto et al. | |
| 2010/0050660 A1 | 3/2010 | Teegen et al. | |
| 2010/0132399 A1 | 6/2010 | Mitra et al. | |
| 2010/0263393 A1 | 10/2010 | Chen et al. | |
| 2011/0030399 A1 | 2/2011 | Lifson et al. | |
| 2011/0048042 A1 | 3/2011 | Chen et al. | |

OTHER PUBLICATIONS

International Preliminary Report on Patentability and Written Opinion for International Application Serial No. PCT/US2012/054123. Date of Mailing Mar. 25, 2014.

International Search Report of the International Searching Authority for Application No. PCT/US2012/054123; Date of Mailing May 23, 2013.

* cited by examiner

TRANSPORT REFRIGERATION SYSTEM WITH ENGINE EXHAUST COOLING

CROSS-REFERENCE TO RELATED APPLICATION

Reference is made to and this application claims priority from and the benefit of U.S. Provisional Application Ser. No. 61/538,304, filed Sep. 23, 2011, and entitled TRANSPORT REFRIGERATION SYSTEM WITH ENGINE EXHAUST COOLING, which application is incorporated herein in its entirety by reference.

BACKGROUND OF THE INVENTION

This invention relates generally to transport refrigeration systems for mobile refrigerated cargo systems and, more particularly, to transport refrigeration systems wherein a prime mover, such as diesel engine, directly or indirectly drives the refrigerant compressor of the transport refrigeration system.

Refrigerated trucks and trailers and intermodal containers, collectively mobile refrigeration systems, are commonly used to transport perishable cargo, such as, for example, produce, meat, poultry, fish, dairy products, cut flowers, and other fresh or frozen perishable products, by road, rail, sea or intermodally. In the case of refrigerated trucks, a transport refrigeration system is mounted to the truck, typically behind the truck or on the roof of the truck for maintaining a controlled temperature environment within the cargo box within the truck. In the case of refrigerated trailers, which are typically pulled behind a tractor cab, a transport refrigeration system is mounted to the trailer, typically to the front wall of the trailer for maintaining a controlled temperature environment within the cargo box of the trailer.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo box by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo box.

On commercially available transport refrigeration systems used in connection with refrigerated trucks and refrigerated trailers, the compressor, and typically other components of the transport refrigeration unit, must be powered during transit by an onboard engine. In the case of refrigerated trailers, the engine typically comprises a diesel engine carried on and considered part of the transport refrigeration system. In mechanically driven transport refrigeration systems the compressor is directly driven by the diesel engine, either through a direct mechanical coupling or a belt drive. An all electric transport refrigeration system for refrigerated trailer application is also commercially available through Carrier Corporation, headquartered in Farmington, Conn., USA. In the all electric transport refrigeration system, the engine, again most commonly a diesel engine, carried on and considered part of the transport refrigeration system, drives an onboard AC synchronous generator that generates AC power. The generated AC power is used to power an electric compressor motor for driving the refrigerant compressor of the transport refrigeration unit.

As noted previously, transport refrigeration systems are provided in connection with mobile refrigeration systems for maintaining a controlled temperature environment within the refrigerated cargo space, such as for example the cargo box of the trailer or truck. Although the refrigeration unit is generally operated in a cooling mode to maintain the temperature within the cargo box at a desired temperature for the product stowed in the cargo box, it may be necessary to actually heat the air within the cargo box particularly in cooler climates and for certain products. Generally, it is also necessary to heat the evaporator coil to melt frost from the outside surface of the evaporator coil. Therefore, the refrigeration unit may be designed for operation in a heating mode and a defrost mode wherein hot refrigerant vapor is directed from the compressor discharge directly to and through the evaporator coil to heat box air passed through the evaporator by the evaporator fan. Alternatively, an electric resistance heater may be provided in proximity to the evaporator coils that may be selectively activated to heat the box air passing through the evaporator or to melt frost off the evaporator coil.

Although both of the aforementioned systems perform well in heating the circulating cargo box air and in defrosting the evaporator coil, both systems require operation of the engine to either drive the compressor for circulating hot refrigerant vapor through the evaporator coil or to drive a generator for producing the electric power to operate the resistance heater, which increases the shaft load on the engine during operation of the refrigeration unit in the heating mode.

SUMMARY OF THE INVENTION

In an aspect, a transport refrigeration system and method of operation are provided wherein the engine exhaust gas flow is cooled before discharge to the atmosphere. In a further aspect, a transport refrigeration system is provided wherein refrigerant may be selectively heated using waste heat from the engine exhaust.

A transport refrigeration system for controlling a temperature associated with a mobile refrigerated cargo box includes: a refrigeration unit having a refrigerant circuit through which a refrigerant is circulated, a compression device, a refrigerant heat rejection heat exchanger, an expansion device and a refrigerant heat absorption heat exchanger wherein refrigerant is passed in heat exchange relationship with air drawn from the cargo box; a fuel fired engine for powering the refrigerant unit and having an exhaust system through which exhaust gases generated by the engine are discharged; and an engine exhaust gas cooler including an exhaust gas pass, a refrigerant pass, and an air flow pass. The exhaust gas pass and the refrigerant pass are disposed in heat exchange relationship and in the air pass. In an embodiment, the engine exhaust gas cooler is disposed in flow communication with an air side pass of the air-cooled refrigerant heat rejection heat exchanger. The engine exhaust system may include a particulate filter disposed downstream with respect to exhaust gas flow of the exhaust gas pass of the engine exhaust gas cooler.

In an embodiment, the refrigerant pass of the engine exhaust gas cooler has an inlet in flow communication with the refrigerant circuit at a location between the compression device and the refrigerant heat rejection heat exchanger and has an outlet in flow communication with the refrigerant circuit at a location between the expansion device and the refrigerant heat absorption heat exchanger. In an embodiment, the refrigeration unit includes a refrigerant receiver disposed in the refrigerant circuit between an upstream segment of the refrigerant heat rejection heat exchanger and a downstream segment of the refrigerant heat rejection heat exchanger, and a bypass line in flow communication with the refrigerant pass of the engine exhaust gas cooler and in flow communication with the receiver.

In an aspect, a heat exchanger is provided that is suitable for use, among other uses, as an air to fluid heat exchanger wherein air may be passed in heat exchange relationship with the engine exhaust flow and in heat exchange relationship with refrigerant flow. The heat exchanger includes an inner tube extending along a central axis of the heat exchanger, an array of a plurality of heat transfer members mounted to the inner tube, and a plurality of outer tubes disposed in parallel relationship to the inner tube, the outer tubes being spaced radially outward from the inner tube and extending longitudinally to pass through the array of heat transfer members. The inner tube defines an internal flow passage through which a first fluid may be passed. Each outer tube defines an internal flow passage through which a second fluid may be passed. The plurality of heat transfer members are arrayed in longitudinally spaced relationship along the inner tube thereby establishing a plurality of flow passages between adjacent heat transfer members through which a third fluid may be passed over the exterior of the heat transfer members and the inner and outer tubes.

In an embodiment, each heat transfer member of the plurality of heat transfer members comprises an annular disk having a radially outer circumferential wall defining an outer boundary of the annular disk and a pair of annular side walls. The radially outer circumferential wall and the pair of annular side walls cooperatively define an internal chamber. The annular disk is affixed to the inner tube in a sealed relationship with the inner tube received in and passing through centrally located holes formed in the side walls of the annular disk, thereby defining a sealed internal chamber. The sealed internal chamber of the annular disk may be filled with air or with a heat transfer working fluid.

When the heat exchanger is employed as an engine exhaust cooler in connection with a transport refrigeration unit, the inner tube defines an internal flow passage through which a flow of engine exhaust gas passes, each outer tube defines an internal flow passage through which a flow of refrigerant passes, and the plurality of flow passages between adjacent heat transfer members defines an air flow passage through the engine exhaust cooler.

BRIEF DESCRIPTION OF THE DRAWINGS

For a further understanding of the disclosure, reference will be made to the following detailed description which is to be read in connection with the accompanying drawings, wherein.

DETAILED DESCRIPTION OF THE INVENTION

Figure 1:
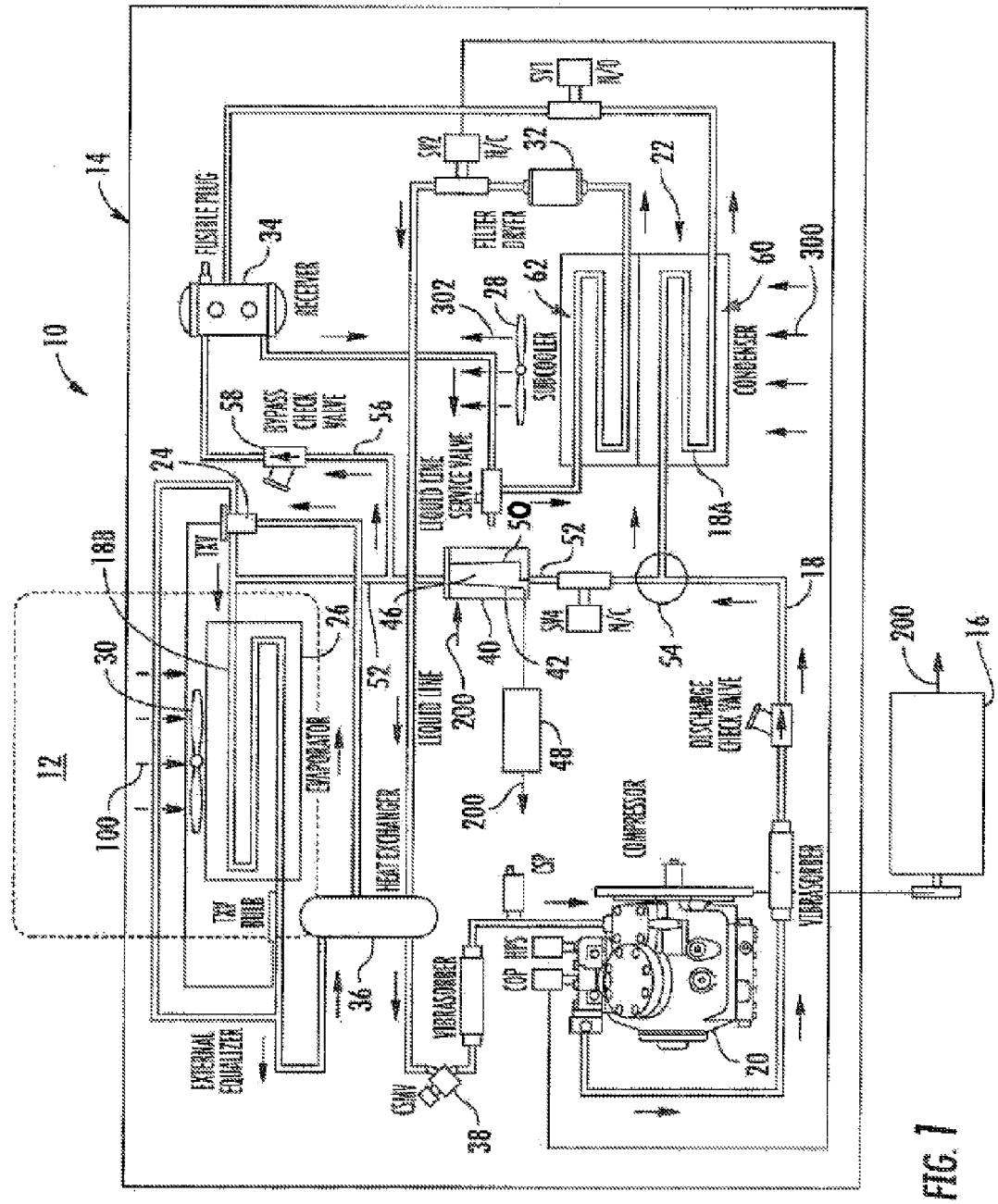
FIG. 1 is a schematic diagram illustrating an exemplary embodiment of a transport refrigeration system including a heat exchanger for cooling engine exhaust gas flow as disclosed herein.

Referring initially to FIG. 1, there is depicted an exemplary embodiment of a refrigeration system 10, which, as disclosed herein, may comprise a transport refrigeration system suitable for conditioning air for controlling a temperature associated with a mobile refrigerated cargo box 12, such as the cargo space of a truck, trailer or container. The transport refrigeration system 10 includes a transport refrigeration unit (TRU) 14 and a prime mover 16, for example a fuel-fired internal combustion engine, such as a diesel engine. TRU 14 includes a refrigerant circuit 18 through which refrigerant is circulated by a refrigerant compressor 20 and passed in heat exchange relationship with air 100 drawn from the cargo box 12. TRU 14 may be operated to establish and regulate a desired product storage temperature within the refrigerated cargo box 12 wherein a perishable cargo, such as, for example, produce, meat, poultry, fish, dairy products, cut flowers, and other fresh or frozen perishable products including blood, pharmaceuticals, chemicals and other temperature sensitive cargo, is stowed for transport and to maintain the product storage temperature within a specified temperature range.

TRU 14 includes a compressor 20, a refrigerant heat rejection heat exchanger 22, an expansion device 24 and a refrigerant heat absorption heat exchanger 26 connected in refrigerant flow communication in a closed loop refrigerant circuit 18 and arranged in a conventional refrigeration cycle. The expansion device 24, which may for example be a thermostatic expansion valve, an electronic expansion valve or other expansion device, is disposed in refrigerant circuit 18 upstream with respect to refrigerant flow of the refrigerant heat absorption heat exchanger 26. The TRU 14 also includes one or more fans 28 associated with the refrigerant heat rejection heat exchanger 22 and one or more fans 30 associated with the refrigerant heat absorption heat exchanger 26. TRU 14 may also include a filter/dryer 32, a receiver 34, a refrigerant to refrigerant heat exchanger 36 and a suction modulation valve 38 interdisposed in refrigerant circuit 18, for example, as depicted in FIG. 1. It is to be understood that other components may be incorporated into the refrigerant circuit as desired, including for example, but not limited to, a filter/dryer, a quench valve, an economizer circuit and various temperature sensors and pressure sensors as customary in conventional practice.

The refrigerant heat rejection heat exchanger 22 includes a refrigerant pass 18A interdisposed in the refrigerant circuit 18 that may, for example, comprise one or more refrigerant conveying coiled tubes or one or more tube banks formed of a plurality of refrigerant conveying tubes extending between respective inlet and outlet manifolds. The associated fan(s) 28 are operative to pass air, typically ambient air 300, across the tubes of the refrigerant heat rejection heat exchanger 22 to cool refrigerant vapor passing through the refrigerant pass 18A. The refrigerant heat rejection heat exchanger 22 may operate either as a refrigerant condenser, such as if TRU 14 is operating in a subcritical refrigerant cycle or as a refrigerant gas cooler, such as if TRU 14 is operating in a transcritical cycle. In the depicted embodiments, the refrigerant pass 18A of the refrigerant heat rejection heat exchanger 22 includes a condenser coil upstream of the receiver 34 and a subcooler coil downstream of the receiver 34.

The refrigerant heat absorption heat exchanger 26 includes a refrigerant pass 18B that may, for example, also comprise one or more refrigerant conveying coiled tubes or one or more tube banks formed of a plurality of refrigerant conveying tubes extending between respective inlet and outlet manifolds. The associated fan(s) are operative to pass air 100 drawn from the cargo box 12 across the tubes of the refrigerant heat absorption heat exchanger 26 to heat and evaporate refrigerant liquid passing through the refrigerant pass 18B and cool the box air. The air cooled in traversing the refrigerant heat rejection heat exchanger 26, which may also be referred to herein as an evaporator, is supplied back to the temperature controlled cargo box. It is to be understood that the term "air" when used herein with reference to the atmosphere within the cargo box 12 includes mixtures of air with other gases, such as for example, but not limited to, nitrogen or carbon dioxide, sometimes introduced into a refrigerated cargo box for transport of perishable produce.

The compressor 20 may comprise a single-stage or multiple-stage compressor such as, for example, a reciprocating compressor, as depicted in FIG. 1, or a scroll compressor. The compressor 20 receives at a suction inlet refrigerant vapor at a suction pressure and suction temperature from the refrigerant circuit 18, compresses the refrigerant vapor through a compression mechanism (not shown) to a higher discharge pressure and a discharge temperature, and returns the refrigerant vapor at the higher pressure and temperature through a discharge outlet to the refrigerant circuit 18 to circulate therethrough. In the depicted embodiment, the compression mechanism of the compression device 20 is driven through a belt drive linking the drive shaft of the engine 16 with a driven shaft of the compression mechanism. In other embodiments, the compression mechanism of the compression device 20 may be driven by the engine 16 through a direct mechanical coupling to the engine drive shaft, or may be driven by an electric motor (not shown) powered with electric power generated on board through an electric generator (not shown) driven by the engine 16.

The engine 16 has an exhaust system through which exhaust gases 200 generated by the engine are discharged to the atmosphere. The refrigeration system 10 further includes an exhaust gases cooler 40 for cooling the engine exhaust gases 200 before release to the atmosphere. The exhaust gas cooler 40 comprises an exhaust gas to air heat exchanger having an exhaust gas pass 42 and an air duct 46. The air duct 46 defines an air side pass through which air 302 having passed through the refrigerant heat rejection heat exchanger 22 passes before discharging to the atmosphere. The exhaust gas pass 42 extends across the air duct 46 and defines a flow passage through which the exhaust gases 200 pass in heat exchange relationship with the air 302 having passed through the refrigerant heat rejection heat exchanger 22 whereby heat is transferred from the exhaust gases 200 flowing through the exhaust gas pass 42 to the air 302 passing through the air duct 46.

In this manner, the exhaust gases 200 may be cooled and the heat removed from the exhaust gases is discharged as waste heat in the air 302 discharged into the atmosphere. For example, the exhaust gases 200 may be cooled from a discharge temperature typically in the range of 500° F. to 1000° F. (260° C. to 538° C.) to a discharge temperature of 500° F. (260° C.) or less. The cooler exhaust temperature of the exhaust gases 200 facilitates the use of a particulate filter for removing particulate material from the exhaust gases 200 before discharging the exhaust gases 200 to the atmosphere. For example, a particulate filter 48 may be installed in the engine exhaust system downstream with respect to the flow of exhaust gases of the exhaust gas pass 42 of the exhaust gas cooler 40, for removing particulate material from the exhaust gases. Cooler exhaust gas temperature prevents the filter material from catching on fire and allows for the use of less exotic and less expensive particulate filters.

In an embodiment of the exhaust gas cooler 40, the exhaust gas cooler 40 further includes a refrigerant pass 50 through which refrigerant from the refrigerant circuit 18 may be passed in heat exchange relationship with the exhaust gases 200 passing through the exhaust gas pass 42 whereby the refrigerant is heated and the exhaust gas flow cooled. For example, as depicted schematically in FIG. 1, refrigerant vapor may be diverted from the refrigerant circuit 18 through refrigerant line 52 to and through the refrigerant pass 50 of the exhaust gas cooler 40. Refrigerant line 52 taps into refrigerant circuit 18 between the compressor 20 and the refrigerant heat rejection heat exchanger 22 and returns to the refrigerant circuit 18 upstream of the inlet to the refrigerant heat absorption heat exchanger 26 and downstream of the expansion device 24, thereby bypassing the refrigerant heat rejection heat exchanger 22 and the expansion device 24.

A flow control device 54 may be interdisposed in the refrigerant line 52 upstream with respect to refrigerant flow of the refrigerant pass 50 of the exhaust gas cooler 40 for selectively controlling the amount of refrigerant flow through refrigerant line 52. The flow control device 54 has a closed position in which refrigerant flow through refrigerant line 52 is blocked and at least one open position in which refrigerant flow may pass through refrigerant line 52. For example, when it is desired to operate the TRU 14 in a box air heating mode or in a defrost mode for removing frost from the heat transfer surface of the refrigerant heat absorption heat exchanger 26, the flow control device 54 may be selectively positioned in an open position whereby refrigerant vapor from the compressor 20 passes through refrigerant line 52 and the refrigerant pass 50 of the exhaust gas cooler 40 and thence directly to the refrigerant heat absorption heat exchanger 26. Thus, shaft power of the engine 16 is reduced relative to the shaft horsepower that would be required when using electric heat or hot gas as in conventional practice during operation in a box heating or defrost mode. This allows a reduction in engine run time during the defrost mode and during the cargo box heating mode and reduces load requirements on the TRU 14.

In an embodiment of the TRU 14, a refrigerant vapor bypass line 56 may be provided that taps into refrigerant line 52 at a location downstream of the refrigerant pass 50 of the exhaust gas cooler 40 and upstream of the refrigerant heat absorption heat exchanger 26 and extends therefrom to open into the receiver 34. The refrigerant vapor bypass line 56 provides a flow path for hot refrigerant vapor having passed through the refrigerant pass 50 of the exhaust gas cooler 40 to bypass the upstream section of the refrigerant heat rejection heat exchanger 22 and pass into the receiver 34 to raise the refrigerant pressure within the receiver 34. A check valve 58 may be disposed in the refrigerant vapor bypass line 56 to prevent backflow of refrigerant from the receiver 34 through the refrigerant vapor bypass line 56.

When the TRU 14 is operated in an environment wherein the outdoor ambient air temperature cooler than the desired temperature to be maintained within the cargo box 12, refrigerant vapor discharged from the compressor 20 may be passed through the refrigerant pass 50 of the exhaust gas cooler 40 in heat exchange relationship with the hot exhaust gas flow and then passed into the receiver 34. Thus, the refrigerant vapor bypasses the section of the refrigerant heat rejection heat exchanger 22 upstream with respect to refrigerant flow of the receiver 34 and is heated by passing in heat exchange with the engine exhaust gas flow 200, rather than being cooled by passing in heat exchange relationship with the flow of ambient air 300. As a result, the refrigerant leaving the downstream section of the refrigerant heat rejection heat exchanger 22 after having passed in heat exchange relationship with the ambient air flow 300 will be higher in temperature than if the refrigerant had instead passed through both sections of the refrigerant heat rejection heat exchanger 22 in heat exchange relationship with the cold ambient air. The resultant rise in the refrigerant outlet pressure accompanying the rise in the refrigeration outlet temperature from the refrigeration heat rejection heat exchanger 22 means an increase in head pressure that stabilizes operation of the compressor 20 and promotes better cargo box temperature control during operation of the TRU 14 under cold ambient conditions than would be experienced without bypassing the upstream section of the refrigerant heat rejection heat exchanger 22.

Figure 2:
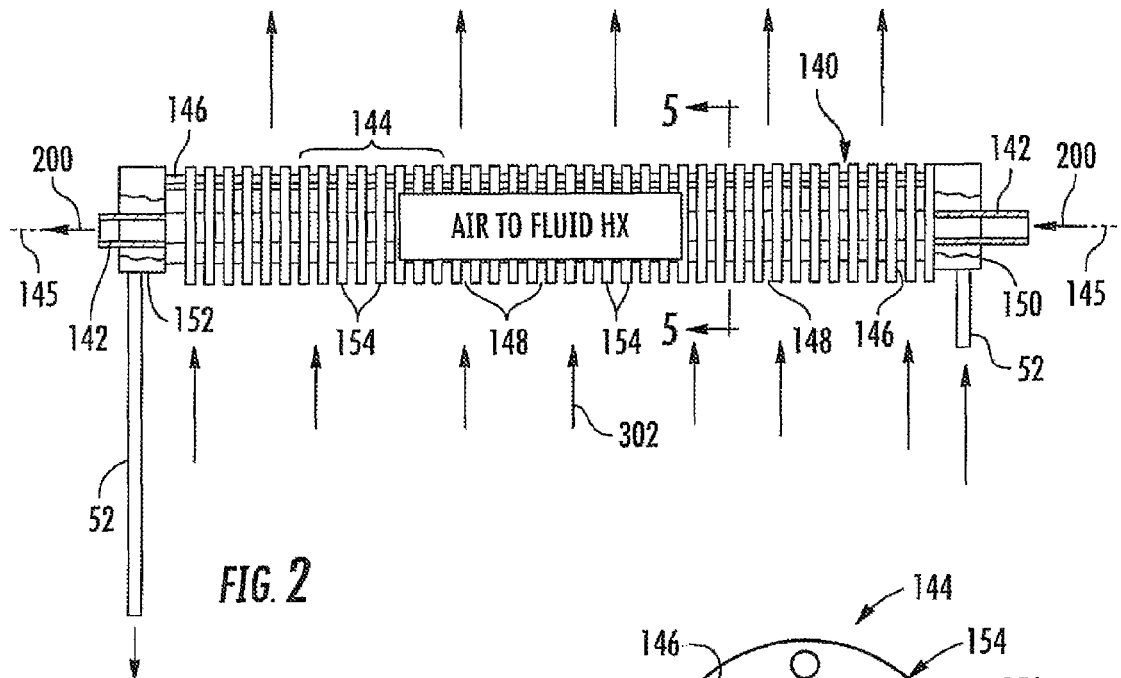
FIG. 2 is a side elevation view of an exemplary embodiment of a heat exchanger for cooling engine exhaust gas flow as disclosed herein.
Figure 6:
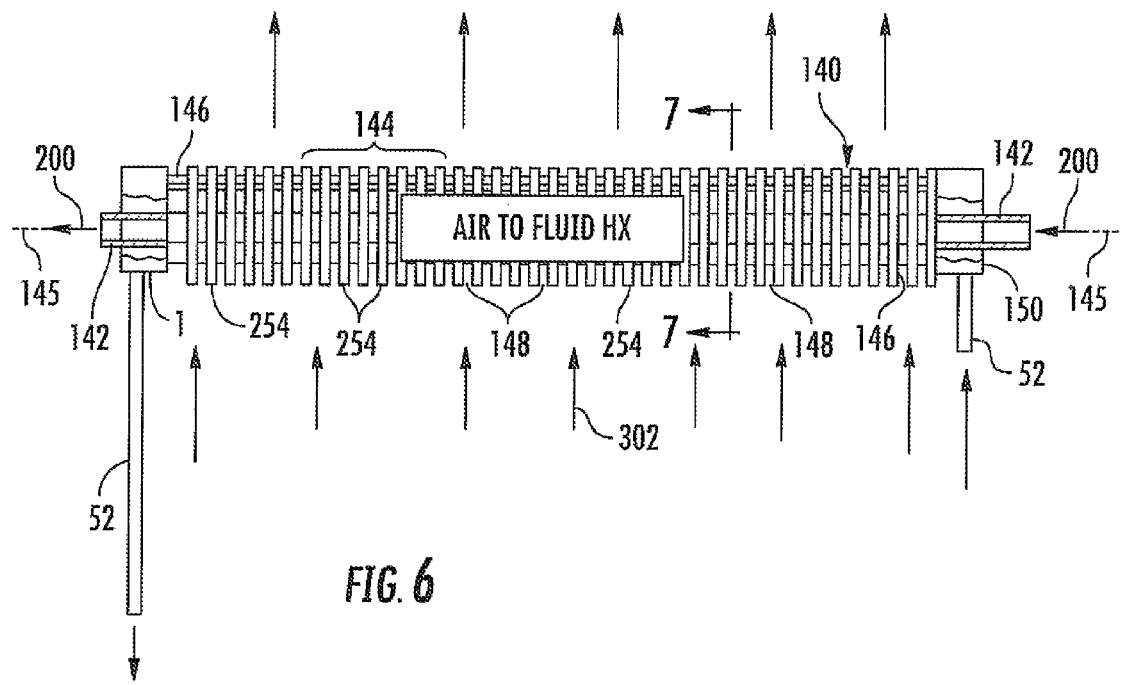
FIG. 6 is a side elevation view of another embodiment of a heat exchanger for cooling engine exhaust gas flow as disclosed herein.

Referring now to FIGS. 2 and 6, there are depicted exemplary embodiments of a heat exchanger 140 particularly suited for service as the exhaust gas cooler 40 disclosed herein. The heat exchanger 140 includes an inner tube 142 extending along a central longitudinal axis 145 of the heat exchanger 140, an array of a plurality of heat transfer members 144 mounted to the inner tube 142, and a plurality of outer tubes 146 disposed in parallel relationship to the inner tube 142. The plurality of outer tubes 146 are spaced radially outwardly of the inner tube 142 and extend longitudinally to pass through the array of heat transfer members 144, penetrating each of the heat transfer members 144. In this manner, the radially outer tubes 146 are connected through the plurality of heat transfer members 144 in heat exchange relationship with the radially inner tube 142. The plurality of heat transfer members 144 are arrayed in longitudinally spaced relationship along the inner tube 142 and are mounted to the inner 142 so as to extend orthogonal to and radially outward from the inner tube 142. Additionally, with the plurality of heat transfer members arrayed in longitudinally spaced relationship, a plurality of flow passages 148 are established through which a fluid may pass between the sets of adjacent heat transfer members 144 and over the exposed external surfaces of the inner tube 142 and the outer tubes 146 lying between adjacent heat transfer members 144.

The inner tube 142 defines an internal flow passage through which a first fluid may be passed. Each of the outer tubes 146 defines an internal flow passage through which one or more second fluids may be passed. The first fluid passing through the internal flow passage of the inner tube 142 and the second fluid or fluids passing through the internal passages of the outer tubes 146 pass in heat exchange relationship with each other as well as with a third fluid passing through the external flow passages 148 defined between the heat transfer members 144. When employed as an exhaust gas cooler 40 in connection with the transport refrigeration unit 14 as disclosed herein, the internal flow passage defined by the inner tube 142 forms the exhaust gas pass 42 through which hot exhaust gases 200 would pass, the internal flow passages defined by the outer tubes 146 collectively form the refrigerant pass 50 through which refrigerant would pass, and the flow passages 148 provide flow paths through which the air flow 302 discharging from the refrigerant heat rejection heat exchanger 22 passes over the external surfaces of the heat transfer members 144.

When installed as the exhaust gas cooler 40 in connection with the transport refrigerant unit 14, the inner tube 142 receives hot exhaust gas flow 200 from the exhaust system of the engine and discharges the cooled exhaust gas flow back into the engine exhaust system upstream of the exhaust gas particulate filter. Each of the outer tubes 146 receives refrigerant from the upstream segment of refrigerant line 52 and discharges heated refrigerant to the downstream segment of refrigerant line 52. As depicted in FIG. 2, the heat exchanger 140 may include an inlet manifold 150 and an outlet manifold 152 with the plurality of outer tubes 146 connected in fluid flow communication with and between the inlet manifold 150 and the outlet manifold 152. The inlet manifold 150 is connected in fluid flow communication with and receives refrigerant from the upstream segment of refrigerant line 52 and distributes the refrigerant received amongst the plurality of outer tubes 146. The outlet manifold 152 is connected in fluid flow communication with and collects refrigerant having traversed the plurality of outer tubes 146 and discharges the collected refrigerant into the downstream segment of the refrigerant line 52. The internal flow passages of the plurality of outer tubes 146 extending between the inlet and outlet manifolds 150, 152 collectively define the refrigerant pass 50 of the exhaust gas cooler 40. The opposite ends of the centrally disposed inner tube 142 penetrate, respectively, through the inlet manifold 150 and the outlet manifold 152.

Figure 3:
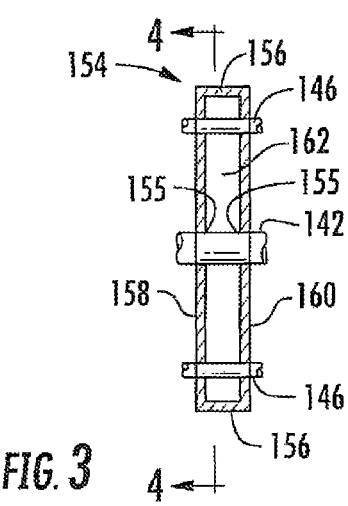
FIG. 3 is a sectioned side elevation view of a single disk-like member of the array of a plurality of disc-like members of the heat exchanger depicted in FIG. 2.
Figure 4:
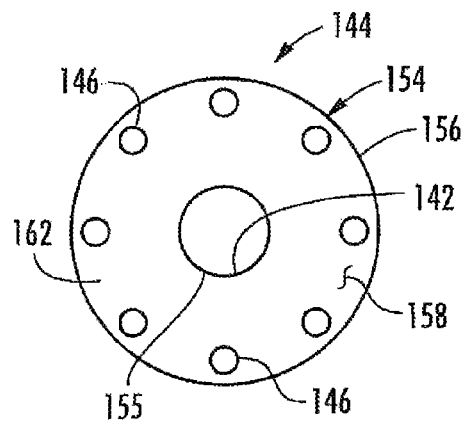
FIG. 4 is a cross-sectioned elevation view taken along line 4-4 of FIG. 3.
Figure 5:
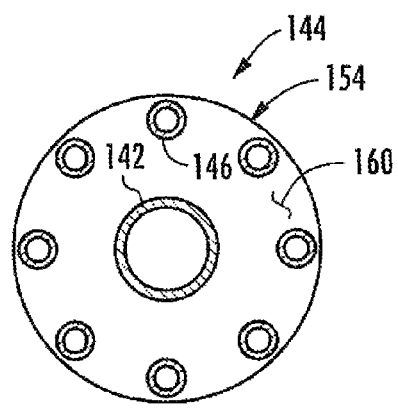
FIG. 5 is an elevation view taken along line 5-5 of FIG. 2.

In the embodiment of the heat exchanger 140 depicted in FIGS. 2-5, and as best seen in FIGS. 2 and 3, each of the disk-like members 144 comprises an annular disk 154 having a radially outer circumferential wall 156 defining the outer boundary of the annular disk 154 and a pair of annular side walls 158, 160, each having a centrally disposed hole 155 formed therein. When the annular disk 154 is mounted on the inner tube 142, the inner tube 142 is received in and passed through the centrally disposed holes of the side walls 158, 160. The side walls 158, 160 are affixed in sealed relationship to the external surface of the inner tube 142, for example by brazing or other metal bonding technique, thereby forming a sealed internal chamber 162. The plurality of outer tubes 146 penetrate through, in sealed relationship with, the side walls 158, 160 of each annular disk 154 to extend through the internal chamber 162 in a circumferential array radially inward of the outer circumferential wall 156.

In an embodiment, the internal chamber 162 of each annular disk 154 may simply be filled with air. In another embodiment, the internal chamber 162 of each annular disk 154 may be filled with a heat transfer working fluid having a relatively high coefficient of heat transfer to enhance heat exchange amongst the exhaust gas flow, the refrigerant flow and the waste air flow from the refrigerant heat rejection heat exchanger 22. For purposes of illustration, but not limitation, the working fluid could, for example, comprise olive oil, glycerin, or other commercially available fluid such as Dowtherm®, an ethylene glycol based heat transfer fluid marketed under the registered trademark by The Dow Chemical Company, Midland, Mich., USA, or other commercially available specialty heat transfer fluid. The heat transfer working fluid filling the internal chamber 162 of the annular disk 154 must have a boiling point higher than the maximum temperature reached by the working fluid at the inner tube 142 under the most stringent operating conditions, e.g. highest exhaust gas temperature, typically in the range of 500-1000° F. (260° C. to 538° C.), so as to ensure that the heat exchange working fluid does not evaporate.

Figure 7:
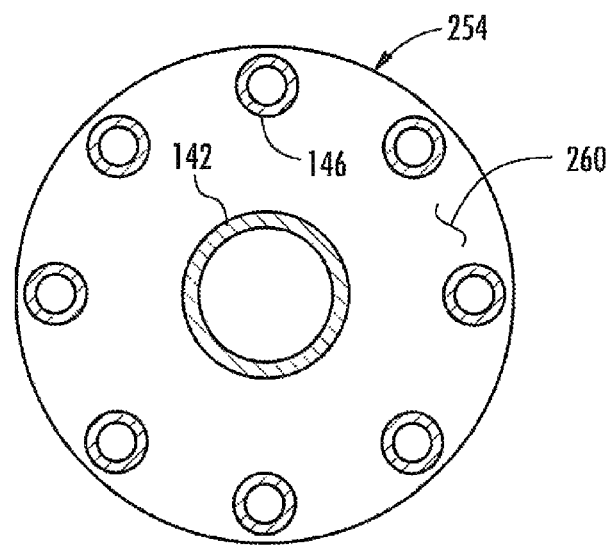
FIG. 7 is an elevation view taken along line 7-7 of FIG. 6.

In the embodiment of the heat exchanger 140 depicted in FIGS. 6 and 7, each of the heat transfer members 144 comprises a heat transfer fin 254. In the depicted embodiment, the heat transfer fin 254 comprises an annular plate 260 having a central opening for receiving the inner tube 142 and a plurality of radially outward openings for receiving the outer tubes 146. When the plurality of heat transfer fins 254 are mounted to the inner tube 142 and the outer tubes 146, the inner tube 142 and the outer tubes 146 penetrate through the array of the plurality of heat transfer fins which are disposed in spaced relationship to provide air flow passages 148 between the respective sets of adjacent heat transfer fins 254.

For purposes of illustration, but not limitation, in an exemplary embodiment of the heat exchanger 140 suitable for use as an exhaust gas cooler 40 in connection with a transport refrigeration unit, the inner tube 142 may be a steel, stainless steel, aluminum or aluminum alloy tube having an internal diameter of 1.75 inches (4.45 centimeters); the outer tubes 146 may be a copper, aluminum or aluminum alloy tube having an internal diameter of 0.375 to 0.5 inches (8.47 to 12.7 millimeters); and the annular disk walls 156, 158, 160 and the heat transfer fins 254 may be made of steel, stainless steel, aluminum or aluminum alloy and having a thickness of 0.003 to 0.012 inches (0.75 to 3) millimeters).

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

The heat exchanger 140 has been described herein with respect to application as an exhaust gas cooler in connection with a transport refrigeration unit. It is to be understood, however, that persons of ordinary skill in the art may adapt the heat exchanger 140 as disclosed herein for other applications, including, for example but not limited to, changing materials, changing dimensions, adapting spatial relationships between the inner and outer tubes, varying the number of outer tubes and/or the arrangement of the outer tubes.

Therefore, although the present invention has been particularly shown and described with reference to the exemplary embodiment as illustrated in the drawing, it will be recognized by those skilled in the art that various modifications, some of which have been mentioned above, may be made without departing from the spirit and scope of the invention. Accordingly, it is intended that the present disclosure not be limited to the particular embodiment(s) disclosed as, but that the disclosure will include all embodiments falling within the scope of the appended claims.

I claim:

1. A transport refrigeration system for controlling a temperature associated with a mobile refrigerated cargo box comprising:
a refrigeration unit having a refrigerant circuit through which a refrigerant is circulated, the refrigeration unit including a compression device, a refrigerant heat rejection heat exchanger, an expansion device and a refrigerant heat absorption heat exchanger wherein refrigerant is passed in heat exchange relationship with air drawn from the mobile refrigerated cargo box;
a fuel fired engine for powering the refrigerant unit, the fuel fired engine having an exhaust system through which exhaust gases generated by the fuel fired engine are discharged; and
an engine exhaust gas cooler including an exhaust gas pass, a refrigerant pass, and an air flow pass, the exhaust gas pass and the refrigerant pass disposed in heat exchange relationship and in the air flow pass;
herein the refrigerant pass of the engine exhaust gas cooler has an inlet connected to the refrigerant circuit at a first location between the compression device and the refrigerant heat rejection heat exchanger and has an outlet connected to the refrigerant circuit at a second location between the expansion device and the refrigerant heat absorption heat exchanger;
a valve positioned in the first location, the valve having a closed position to prevent the refrigerant from entering the inlet of the refrigerant pass of the engine exhaust gas cooler and an open position to allow the refrigerant to enter the inlet of the refrigerant pass of the engine exhaust gas cooler.

2. The transport refrigeration system as recited in claim 1 wherein the refrigerant pass of the engine exhaust gas cooler is disposed in flow communication with an air side pass of the refrigerant heat rejection heat exchanger.

3. The transport refrigeration system as recited in claim 1 further including:
a refrigerant receiver disposed in the refrigerant circuit between an upstream segment of the refrigerant heat rejection heat exchanger and a downstream segment of the refrigerant heat rejection heat exchanger; and
a bypass line in flow communication with the refrigerant pass of the engine exhaust gas cooler and in flow communication with the refrigerant receiver.

4. The transport refrigeration system as recited in claim 1 wherein the exhaust system includes a particulate filter disposed downstream with respect to exhaust gas flow of the exhaust gas pass of the engine exhaust gas cooler.

5. The transport refrigeration system as recited in claim 1 wherein the engine exhaust gas cooler comprises:
an inner tube extending along a central axis of the engine exhaust gas cooler;
an array of a plurality of heat transfer members mounted to the inner tube; and
a plurality of outer tubes disposed in parallel relationship to the inner tube, the outer tubes spaced radially outward from the inner tube and extending longitudinally to pass through the array of the plurality of heat transfer members.

6. The transport refrigeration system as recited in claim 5 wherein: the inner tube defines an internal flow passage through which a first fluid may be passed; each outer tube of the plurality of outer tubes defines an internal flow passage through which a second fluid may be passed.

7. The transport refrigeration system as recited in claim 6 wherein the array of the plurality of heat transfer members are arrayed in longitudinally spaced relationship along the inner tube thereby establishing a plurality of flow passages between adjacent heat transfer members.

8. The transport refrigeration system as recited in claim 7 wherein the plurality of heat transfer members are mounted to the inner tube so as to extend orthogonal to and radially outward from the inner tube.

9. The transport refrigeration system as recited in claim 6 further comprising:
an inlet manifold;
an outlet manifold;

the plurality of outer tubes connected in fluid flow communication with and between the inlet manifold and the outlet manifold.

10. The transport refrigeration system as recited in claim 5 wherein the heat exchanger is employed as an engine exhaust cooler in connection with a transport refrigeration unit, and wherein the inner tube defines an internal flow passage through which a flow of engine exhaust gas passes, each outer tube defines an internal flow passage through which a flow of refrigerant passes, and the plurality of flow passages between adjacent heat transfer members defines an air flow passage external of the heat transfer members.

11. The transport refrigeration system as recited in claim 5 wherein each heat transfer member of the plurality of heat transfer members comprises an annular disk having a radially outer circumferential wall defining an outer boundary of the annular disk and a pair of annular side walls, each side wall having a centrally disposed hole formed therein, the radially outer circumferential wall and the pair of annular side walls defining an internal chamber.

12. The transport refrigeration system as recited in claim 11 wherein the annular disk is affixed to the inner tube in a sealed relationship with the inner tube received in and passing through the central holes formed in the side walls of the annular disk, thereby defining a sealed internal chamber.

13. The transport refrigeration system as recited in claim 12 wherein the sealed internal chamber of the annular disk is filled with a heat transfer working fluid.

14. The transport refrigeration system as recited in claim 5 wherein each heat transfer member comprises a heat transfer fin.

* * * * *